United States Patent [19]
Trosper et al.

[11] 3,878,635
[45] Apr. 22, 1975

[54] FISHING ROD SIGNALLING DEVICE

[76] Inventors: Raymond Trosper, 2137 W. Olive;
Richard E. Nixt, 1130 W. Ash, both of Fullerton, Calif.

[22] Filed: June 10, 1974

[21] Appl. No.: 477,695

[52] U.S. Cl. .................................................. 43/17
[51] Int. Cl. .............................................. A01k 97/12
[58] Field of Search ............... 43/17, 16, 17.5, 17.6

[56] References Cited
UNITED STATES PATENTS

| | | | |
|---|---|---|---|
| 2,790,263 | 4/1957 | Chaney | 43/17 |
| 2,986,835 | 6/1961 | Ordinetz et al. | 43/17 |
| 3,188,767 | 6/1965 | Finefield | 43/17 |
| 3,461,592 | 8/1969 | Makino | 43/17 |

*Primary Examiner*—Warner H. Camp
*Attorney, Agent, or Firm*—Harold C. Horwitz

[57] ABSTRACT

A fishing rod signalling device comprising a non-metallic housing clamped to a fishing rod with a magnetically responsive trigger device actuating signal means when fishing line strain increases magnetic field. Trigger response is continuously, infinitely and selectively adjustable for variable line drag conditions. Signal housing is watertight with adjustable components exterior to the housing.

1 Claim, 6 Drawing Figures

FISHING ROD SIGNALLING DEVICE

BACKGROUND OF THE INVENTION

This invention relates to signalling means for a fishing rod which provides a selective response to a strain on the fishing line and which provides a signal for an appropriate line movement indicating a "strike" by a fish.

There are many prior art devices for providing signal means when a fishing line is strained but the prior art invariably accomplishes signal reaction by direct coupling of line through the signal housing. Such direct coupling through the signal housing makes watertight devices difficult, cumbersome and expensive to design.

Other prior art devices are limited by step adjustments such that the responses for differing drag conditions are made in discrete steps. Such systems will not respond to conditions which require an adjustment between steps; such requirements sometimes occur for variations of tide, water turbulence or boat speed.

SUMMARY OF THE INVENTION

It is a primary object of this invention to provide an attachment for a conventional fishing pole which will indicate visually, or aurally, or both, a "strike" by a fish and which will overcome the limitations found in prior art signalling devices.

This invention embodies a signal housing having means for effecting carriage thereof by a fishing rod, having a chamber means for replaceably supporting bi-terminal batteries and signal means and having a magnetic switch responsively mounted therein. It is to be understood that although a light bulb is disclosed as a preferred embodiment of the signal means, other means may be used instead of, or in addition to, said means.

The magnetic switch reacts with the magnetic field generated by a magnetic pulley mounted exterior to the signal housing. When fishing line is strained, the pulley system rotates such that the magnetic field at the switch is increased. A pre-adjusted magnetic field level, if exceeded, will close the magnetic switch and actuate the signal means.

A clamp assembly which secures the signal housing to the fishing rod also provides manual adjustment for drag control. Slide means, adjustably mounted on the clamp, may compress or relax spring tension acting on the pulley system on which fishing line is supported. If spring tension is relieved, slight pull on the line will cause the pulley system to rotate and the magnetic field radiated by the magnetic pulley will react with the magnetic switch in the signal housing and the switch will close, activating the signal means.

Where greater turbulence exists in water or slower reaction is required for other reasons, manual adjustment may be made to increase the spring tension, thereby requiring greater pull for rotation of the pulley system and the magnetic switch closure.

DESCRIPTION OF THE PREFERRED EMBODIMENTS

Figure 1:
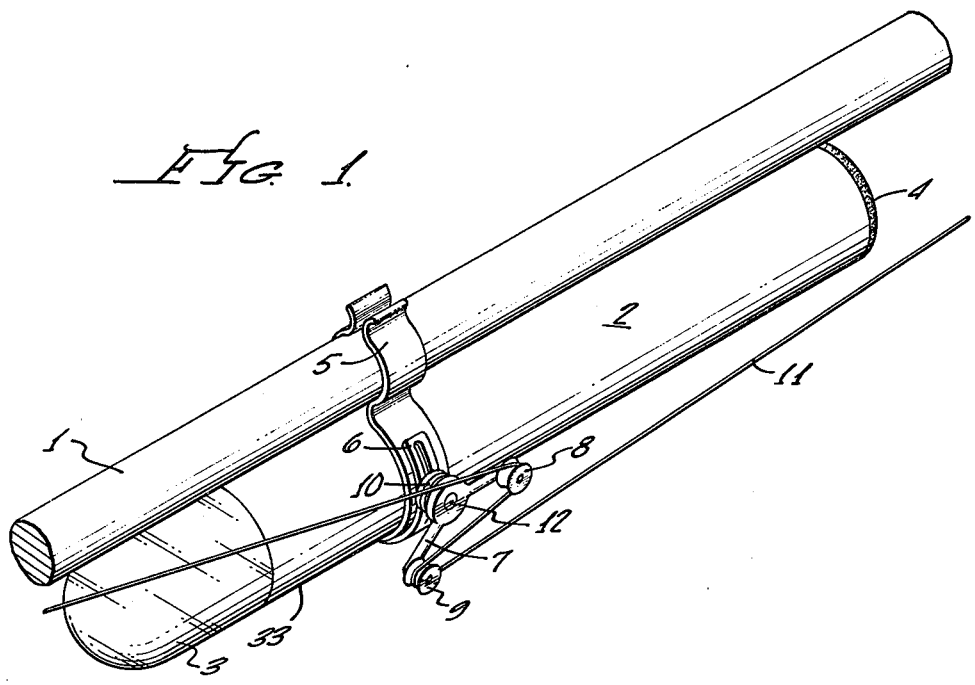
FIG. 1 is a angular perspective view of a preferred embodiment of the invention clamped to a fishing pole.

A preferred embodiment of the fishing rod signalling device is shown in FIG. 1 wherein device 33 is clamped to rod 1 by clamp means 5. Signal means 33 comprises a non-metallic housing 2 having a lens cap 3 at one end and a removable cap 4 at the other end thereof. Further, clamp 5 has slide assembly 6 slidably mounted thereon for drag adjustment as will be hereinafter more fully described. Pulley system 7 is shown with fishing line 11 engaged with pulleys 8 and 9. When line 11 is strained by a "strike", pulleys 8 and 9 rotate about their own axis and the pulley system rotates about system axis pin 12. Pulley 8 is made of magnetic material in this preferred embodiment; other embodiments might have a magnet mounted near pulley 8 such that a changing magnetic field is communicated to magnetic switch 19 upon movement of the pulley system.

Figure 2:
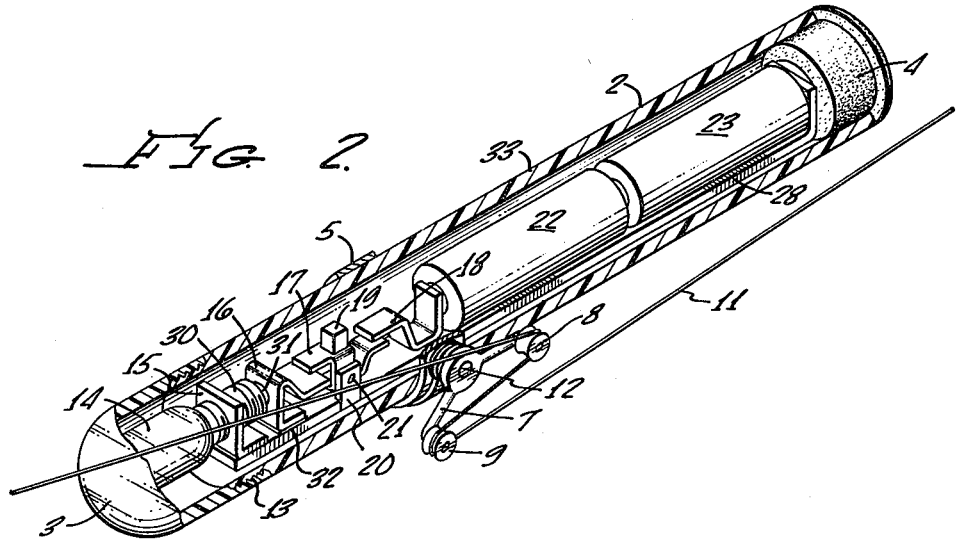
FIG. 2 is cutaway view of FIG. 1 showing the interior mounting means.

FIG. 2 discloses a cutaway view of signal device 33. Lens cap 3 is mounted on housing body 2 by threaded means 13. Bulb 14 is threadedly mounted on clip 15, and the clip means also serving to connect lamp base 30 to the ground plane bar 28. Bulb terminal 31 connects to clip 16, which clip acts as one terminal of a switch. Magnetic switch assembly 17 is rotatably mounted on pin 21 which secures the assembly to pivot frame 20. Pivot frame 20 is made of insulative material. Magnet 19 is mounted on switch assembly 17. Clip 18 is insulated from the ground plane bar and is connected to the positive side 24 of battery 22. When magnetic pulley system 7 rotates counterclockwise, the magnetic field at magnet 19 will increase, causing magnetic switch assembly 17 to rotate counterclockwise and contact clips 16 and 18 for a completed circuit from lamp base 31 to positive terminal 24 of battery 22. Batteries 22 and 23 are removably mounted in the signal housing and secured therein by rubber cap 4.

Figure 3:
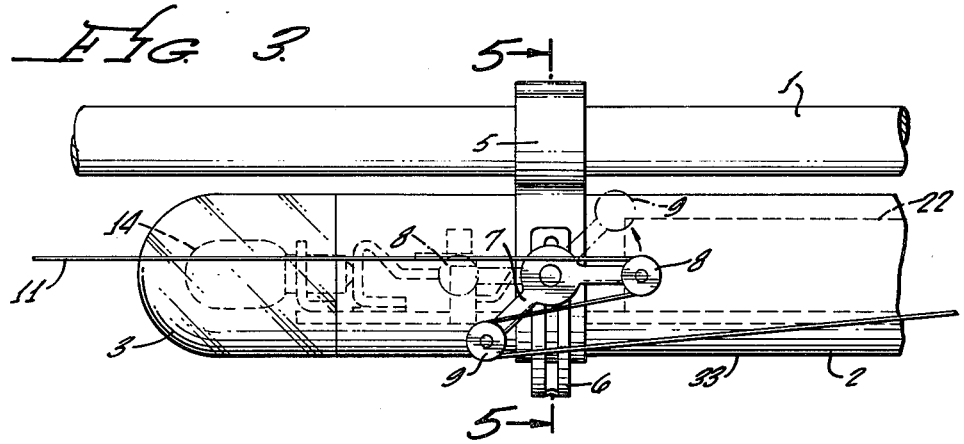
FIG. 3 is a side view showing the pulley system, clamp means and response adjustment means.

FIG. 3 discloses pulley system 7 in two positions, solid line before movement and dotted line after strain on line causes system rotation. On movement of pulley system 7, magnetic switch 17 rotates about pin axis 21, completes the electrical circuit and lights lamp 14.

Figure 4:
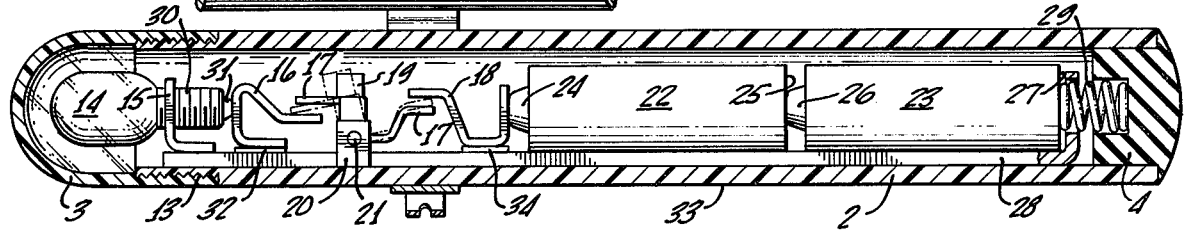
FIG. 4 is a side view section of the preferred embodiment.

Dotted lines in FIG. 4 discloses rotation position of the magnetic switch. Clip 18 is connected to insulator 34 which in turn is secured to ground plane bar 28. Spring 29 provides friction coupling between ground plane 28 and negative side 27 of battery 23.

Figure 5:
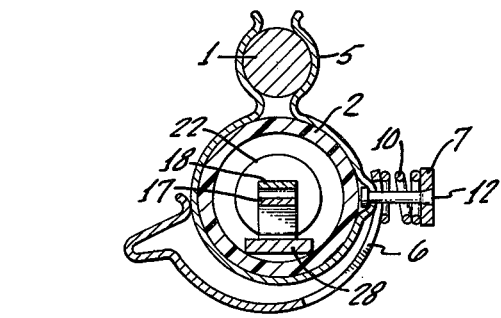
FIG. 5 is a sectional view taken on line 5—5 of FIG. 3.
Figure 6:
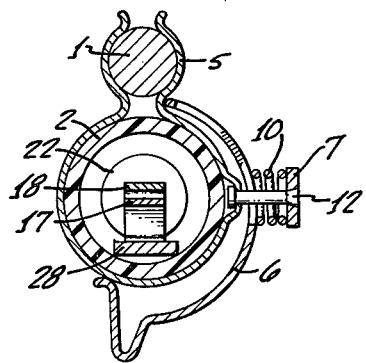
FIG. 6 is a sectional view taken on line 5—5 of FIG. 3 with the manual adjuster in high drag position.

FIGS. 5 and 6 disclose clamp means 5 and slide adjustment assembly 6 in position for different drag conditions. FIG. 5 illustrates clamp means 5 secured about fishing pole 1 and signal housing 2. Pin 12 provides for slidable mounting of slide 6 over clamp assembly 5. Pin 12 also retains pulley assembly 7 in tension relationship to slide 6. Spring 10 is shown at minimum compression in FIG. 5 and permits for easy rotation of the pulley system as might be encountered when fishing in still waters.

FIG. 6 illustrates slide assembly 6 setting spring 10 at maximum compression. At maximum compression, pulley system 7 will rotate in response to greater pull which is now required to overcome greater friction exerted on the pulley system.

I claim:

1. A signalling device used on a fishing rod comprising:

a housing;

said housing having means for effecting carriage thereof by said fishing rod, and having chamber means for replaceably supporting bi-terminal electrical batteries and lamp;

magnetic switch means responsive to magnetic signal means;

said magnetic switch means effecting an electrically conducting engagement between said batteries and said lamp to produce a sensible signal; wherein said magnetic signal means include means selectively adjustable for infinitely controlling the movement thereof, and comprises a rotatable pulley system having a magnetic pulley and a simple pulley engaging fishing line of said fishing rod;

said selectively adjustable means comprises a slidable member in captive engagement with said carriage means and said pulley system, said engagement compressibly maintained by spring means therebetween.

* * * * *